United States Patent

[11] 3,565,077

[72] Inventor Arthur Glick
 Danbury, Conn.
[21] Appl. No. 726,881
[22] Filed May 6, 1968
[45] Patented Feb. 23, 1971
[73] Assignee American Cyanamid Company
 Stamford, Conn.

[54] DENSIFIED ABSORBABLY POLYGLYCOLIC ACID SUTURE BRAID, AND METHOD FOR PREPARING SAME
 4 Claims, 6 Drawing Figs.
[52] U.S. Cl...................................................... 128/335.5,
 161/172
[51] Int. Cl....................................................... A61l 17/00
[50] Field of Search............................................ 128/335.5,
 334; 164/288, 290; 161/172; 87/8; 28/(Inquired)

[56] References Cited
UNITED STATES PATENTS

| | | | |
|---|---|---|---|
| 3,187,752 | 6/1965 | Glick............................ | 128/335.5 |
| 3,297,033 | 1/1967 | Schmitt et al................ | 128/335.5 |
| 3,371,069 | 2/1968 | Miyamae et al.............. | 128/335.5X |
| 3,422,181 | 1/1969 | Chirgwin...................... | 128/335.5X |
| 3,440,225 | 4/1969 | Sattler et al.................. | 264/290X |

*Primary Examiner*—Dalton L. Truluck
*Attorney*—Samuel Branch Walker

ABSTRACT: The densified polyglycolic acid suture braid is characterized by a tightly compacted braid structure, and has a void fraction of up to about 50 percent less than the void fraction of conventionally fabricated nondensified suture braids. The densified braid is prepared by subjecting a nondensified braid to a tensile force of up to about three-fourths that required to break the nondensified braid. The densified suture braid exhibits substantially enhanced in vivo strength retention compared to nondensified braids.

PATENTED FEB 23 1971 3,565,077

INVENTOR.
ARTHUR GLICK

BY

Lawrence William Flynn

AGENT

DENSIFIED ABSORBABLY POLYGLYCOLIC ACID SUTURE BRAID, AND METHOD FOR PREPARING SAME

BACKGROUND OF THE INVENTION

At the present time, virtually all absorbable sutures used in animal and human surgery are prepared from mammalian intestine, such sutures being commonly called catgut sutures. Catgut sutures are not prepared in braided configuration but instead are prepared by twisting and stretching one or more wet ribbons of intestine into an essentially circular cross sectioned suture strand, and then drying the strand under tension, such sutures being by the nature of their preparation highly densified. Nonabsorbable sutures such as silk, nylon, polyethylene, polypropylene, oriented polyesters, and such, however, are prepared in braided configuration since these materials can be readily extruded into filaments, which can then be fabricated into braid. It is common practice to subject these nonabsorbable suture braids to varying tensile forces in order to compact that braid and improve the strength of the braid. However, since these sutures are not absorbed by the body, such compaction has no meaningful effect on in vivo strength retention characteristics of the suture braid.

In recent years, wide spread research efforts have been directed towards the discovery of a synthetic material which could be readily extruded into filaments from which sutures could be fabricated which would retain their tensile strength after implantation in the body for a sufficient time to permit wounds joined together with such sutures to heal properly and which, furthermore, would be absorbed by the body within a prescribed time after the implantation. Such a material would have many advantages over catgut, such as uniformity of composition and, hopefully, ease of manufacture. These efforts have recently borne fruit. U.S. Pat. 3,297,033, for example, describes a synthetic absorbable suture prepared from polyglycolic acid, said patent herein incorporated by reference. The polyglycolic acid is extruded into filaments which are fabricated into a braid to produce a highly acceptable absorbable suture. Ordinarily, it is desirable that an absorbable suture retain a surgically useful tensile strength for up to 10 to 15 days after implantation; it is equally important that the suture be absorbed by the body soon thereafter, preferably within about 90 days after implantation. Achievement of these dual requirements often presents a problem because treatments which enhance in vivo strength retention of the suture frequently extend the absorption period appreciably. For example, when catgut sutures are chromicized to enhance in vivo strength retention, conditions must be carefully controlled to prevent excess chromicizing since otherwise, suture absorption times can be unduly prolonged. These problems are, however, conveniently overcome by the polyglycolic acid suture braids of this invention wherein in vivo strength retention is substantially enhanced without unduly prolonging absorption of the suture.

SUMMARY OF THE INVENTION

This invention relates to a densified absorbable polyglycolic acid suture braid of enhanced in vivo properties and suitable absorption characteristics. More particularly, this invention relates to a densified polyglycolic acid braid having a tightly compacted braid structure, and a void fraction up to about 50 percent less than the void fraction of a nondensified braid.

The term "braid" means a substantially symmetrical strand formed by crossing a number (and at least three) of individual strands composed of one or more filaments diagonally in such manner that each strand passes alternatively over and under one or more of the others; the braid may include a core section composed of one or more filaments around which the braid is externally fabricated, although such core may be excluded, if desired.

The term "nondensified braid" means a braid prepared with conventional braiding equipment which has not been subjected to any compacting force following its preparation and which is characterized by a loose or noncompacted braid structure.

The term "densified braid" means a nondensified braid which has been subjected to tensile force or other compacting forces whereby the apparent density of the nondensified braid is increased.

The densified suture braids of this invention demonstrate substantially enhanced in vivo tensile strength retention for up to 15 days after implantation and are, at the same time, completely absorbed by the body within 60 to 90 days after implantation in living muscular tissue.

In addition to the enhanced in vivo properties observed, the densified suture braids offer many other advantages. Since the braid has been stretched, the fiber is generally nonyielding eliminating tissue cuts which might otherwise occur when closing a surgical wound with a suture which elongates when tied into a knot. Since the suture braid is compacted, the surface of the braid is quite smooth resulting in less tissue trauma during surgery. The compact nature of the braids also reduces capillarity which, in turn, inhibits spread of infection. The tightness of the braid also reduces an undesirable "brooming" effect, i.e. the flaring of individual filaments of the braid when the braid is cut. Compaction of the braid also makes it possible to prepare the strongest suture possible for a given suture size. By densifying or compacting the braid and thus reducing the void fraction thereof, it becomes possible to increase the number of filaments within a given diameter and thereby the apparent density of the braid; in effect, the braid cross section approaches that of a monofilament. Generally, it is impractical to directly form a monofilament having the desired suture diameter since such a monofilament, particularly in the case of the larger sized sutures, lacks the flexibility desired in a suture. The densified braid of this invention, on the other hand, approaches the strength of a monofilament suture, while retaining a high degree of flexibility.

It is theorized that the enhanced in vivo properties observed with the densified suture braid of this invention may result from the reduced void fraction of the braid, which, in turn, may cause a substantial reduction in the amount of suture surface exposed to the attack of tissue fluids. The reduced void fraction may further slow penetration of tissue fluid into the interstices of the braid. As a result, as a braid becomes progressively more densified, the in vivo tensile strength, i.e., the tensile force required to break the braid after 7 and 15 day implantations in rabbits, becomes progressively greater.

The densified suture braids of this invention are conveniently prepared by subjecting nondensified braids to a tensile force up to about three-fourths of the straight pull of the nondensified braid, where "straight pull" means the tensile force, measured in any convenient units such as pounds or kilograms, required to break the nondensified braid.

DESCRIPTION OF THE PREFERRED EMBODIMENTS

For purpose of illustration, the following discussion is in terms of polyglycolic acid suture braids, although other materials which can be fabricated into absorbable suture braids such as, for example, regenerated collagen filaments or other synthetic absorbable polymeric materials could also be used.

Polyglycolic acid as prepared in U.S. Pat. No. 3,297,033 is conventionally extruded into a 100 denier multifilament which contains 16 monofilaments each having an approximate diameter of 0.954 mils. The multifilament is subdivided into the following three portions; a 50 denier, 8 filament portion; a 75 denier, 12 filament portion; and a 25 denier, 4 filament portion for use as sleeves and cores during braiding. The "sleeve" is that portion of braid composed of yarn from the carriers of the braiding equipment. The "core" is that portion of the braid which fills the lumen of the braid. The core may be a twist, braid, ply, cable, or other suitable configuration. The selection of a braiding configuration depends largely upon the required braid size. The relationship between braid size and braid diameter is governed by United States Pharmacopeia (U.S.P.) standards as shown below:

TABLE I

| SIZE | DIAMETER(mils) |
|---|---|
| 7-0 | 2-3 |
| 6-0 | 3-4 |
| 5-0 | 4-6 |
| 4-0 | 6-8 |
| 3-0 | 8-10 |
| 2-0 | 10-13 |
| 1-0 | 13-16 |
| 1 | 16-19 |
| 2 | 19-22 |
| 3 | 22-25 |

The preparation of polyglycolic acid suture braids of various U.S.P. sizes may be accomplished using conventional braiding equipment and the braid constructions shown below in Table II.

It should be noted that the braid configurations in Table II are designed to prepare a braid having the maximum allowable U.S.P. diameter within a given suture size; for example, the braid construction for a size 5-0 suture is designed to produce a braid diameter of about 6 mils and not a diameter of 4 or 5 mils. The calculated percent voids as discussed further hereinbelow is likewise based on the maximum U.S.P. braid diameter within each size range, i.e., upon a 6 mil diameter in the case of a size 5-0 suture braid.

"Total carriers" means the number of available carrier positions on the braiding machine. Thus when there are 6 carriers per 12 total carriers, i.e. 6/12, this means that only 6 of the 12 carrier positions are being used.

Figure 2:
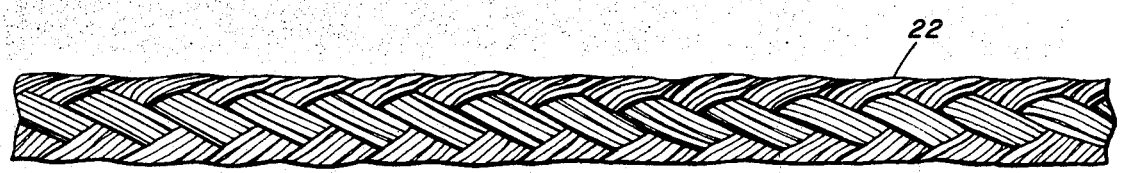
FIGS. 2 to 4 are enlarged elevational side views showing sequentially the effect of progressively increasing the tensile force during braid stretching upon the compaction and densification of the braid structure.

An "end" represents a composite of individual filaments handled as a single thread. These ends may be twisted or otherwise held intact to function as a single thread.

produced has a loose braid construction, as can be seen in braid 22 of FIG. 2.

Since individual monofilaments are merely fabricated into a braid during the braiding operation and are not stretched therein, the void fraction of the nondensified braid resulting therefrom may be readily computed by subtracting the volume of the monofilaments comprising the braid from the total braid volume, this total braid volume, in the case of braids having a circular cross section, being the volume of a cylinder having a diameter equal to the measured diameter of the braid. The following formula is particularly convenient for making this computation:

$$\left(\frac{D_m}{D_b}\right)^2$$

wherein:
$N_m$ is the number of monofilaments of diameter, $D_m$, used to prepare the braid (see column 2 of table II),
$D_m$ is the diameter of the monofilaments used to prepare the braid (in this case 0.954 mils), and
$D_b$ is the measured diameter of the nondensified braid.

In the above formula, it is, of course, possible to compute the volume of the monofilaments per unit length of braid in terms of the density of the filament material (the density of polyglycolic acid is 1.4 to 1.5 grams per cubic centimeter) and denier of the cores and sleeves used in constructing the braid (see columns 5 and 6 of Table II), such calculation merely involving mathematical manipulation of the above formula.

On occasion, braids having noncircular cross sections may be utilized as sutures. For example, braids having a square cross section with the edges of the square having some curvature have been used as sutures. Void fractions of these braids may be readily computed in accord with the principle outlined above, except total braid volume must be computed on the basis of the appropriate cross section, in this case the square with rounded edges.

The equation presented hereinabove for computing void fraction is merely illustrative, and other suitable mathematical equations, as well as physical measurements which determine percent voids, may also be used to compute the void fraction of nondensified braid.

Void fractions of nondensified braids, as computed by the above formula, will ordinarily range from about 26 percent to about 45 percent (see column 8 of Table II), corresponding to a polyglycolic acid braid apparent density of from about 0.8 to about 1.05 grams per cubic centimeter.

The densified suture braids of this invention are readily prepared by subjecting nondensified braid described hereinabove to a tensile force up to about three-fourths of the

TABLE II.—BRAID CONSTRUCTIONS

| Size: | No. of monofilaments per braid | Total denier of braid | No. of carriers used per total carriers | Sleeve | Core | Pick count, crossovers/ inch | Calculated percent voids |
|---|---|---|---|---|---|---|---|
| 5-0 | 28 | 175 | 6/12 | 1 end: 25 denier, 4 filament | 1 end: 25 denier, 4 filament | 40 | 30 |
| 4-0 | 48 | 300 | 8/8 | ...do... | 1 end: 100 denier, 16 filament | 46 | 33 |
| 3-0 | 80 | 500 | 8/8 | 1 end: 50 denier, 8 filament | ...do... | 40 | 28 |
| 2-0 | 128 | 800 | 12/12 | ...do... | 2 ends: 100 denier, 16 filament | 50 | 31 |
| 1-0 | 192 | 1,200 | 16/16 | ...do... | 4 ends: 100 denier, 16 filament | 50 | 33 |
| 1 | 240 | 1,500 | 12/12 | 1 end: 75 denier, 12 filament | 6 ends: 100 denier, 16 filament | 50 | 40 |
| 2 | 320 | 2,000 | 16/16 | ...do... | 8 ends: 100 denier, 16 filament | 40 | 41 |
| 3 | 384 | 2,400 | 16/16 | 1 end: 100 denier, 16 filament | ...do... | 40 | 45 |

Pick count is determined by the relationship between braid pull away speed and the rotational speed of the carriers. Typical pick counts in suture braids run from 40 to 80 crossovers per inch.

During the braiding step, it is ordinarily not possible to subject braid to any substantial tension while it is being formed because of the danger of breaking the individual monofilaments in the sleeves and cores. As a result, the braid which is tensile force required to break the nondensified braid, this force commonly called the "straight pull" value. The straight pull of the nondensified braid may be readily measured using a Scott inclined plane tester (Model IP-4) in accord with known methods such as shown at U.S.P. XV, page 938. Typical straight pull and knot pull values for nondensified polyglycolic acid braids are shown in Table III. Knot pull is measured by placing one turn of suture around a flexible rubber tube and tying a surgeon's knot; the knot is then placed midway between the two clamps of the inclined plane tester and the force required to break the braid is the knot pull. Detailed techniques for measuring knot pull are shown at U.S.P. XV, page 939. Knot pull values are usually lower than straight pull values. The significance of the knot pull values in Table III is discussed hereinbelow.

TABLE III

NONDENSIFIED-POLYGLYCOLIC ACID SUTURE BRAID

TABLE III.—NON DENSIFIED-POLYGLYCOLIC ACID SUTURE BRAID

| Braid size: | Average straight pull, lb. | Average knot pull, lb. |
|---|---|---|
| 7-0 | 1.1 | .7 |
| 6-0 | 1.7 | 1.0 |
| 5-0 | 2.9 | 1.7 |
| 4-0 | 4.5 | 2.7 |
| 3-0 | 6.7 | 4.0 |
| 2-0 | 9.9 | 6.2 |
| 1-0 | 14.0 | 9.4 |
| 1 | 19.5 | 13 |
| 2 | 26 | 17 |
| 3 | 33 | 23 |

Tensile forces in excess of three-fourths of the straight pull tend to cause excessive stretching of the individual monofilaments thereby causing a substantial decrease in the tensile strength of the monofilament. However, when tensile forces below three-fourths of the straight pull are used, only minimal elongation of the filaments is observed with braid compaction and densification occurring primarily by the filaments collapsing into the available voids of the nondensified braid. When maximum tensile force is used, i.e. three-fourths the straight pull of the nondensified braid, the diameter of the densified braid is usually about 10 to 12 percent less than the diameter of the nondensified braid; as the amount of tensile force applied to the braid is increased, the diameter of the braid correspondingly decreases. It is, of course, desirable to produce as highly densified a suture braid as possible in order to insure maximum enhancement of the in vivo properties of the braid. It is often preferable, however, to subject the non-compacted braid to tensile forces somewhat less than the maximum mentioned hereinabove in order to prevent breakage of the braid and to minimize the possibility of overstretching the braid and thereby reducing its strength. Generally, subjecting the braid to a tensile force approximating the knot pull of the nondensified braid or less is quite suitable. The knot pull is usually about 60 to 70 percent of the straight pull of the non-densified braid as can be seen from the knot pull data shown in Table III.

The noncompacted braid elongates when subjected to the tensile force, this elongation being primarily due to the collapse of the filaments into the void fraction of the braid as discussed hereinabove and not to actual stretching of the filaments. The amount of elongation achieved will depend upon the tensile force applied to the braid. Generally, the braid will elongate from about 1 percent to as much as about 25 percent, the latter FIG. occurring when the maximum allowable tensile force is applied.

As nondensified braid is densified in accordance with the process described hereinabove, the void fraction of the non-densified braid is reduced anywhere from about 1 percent to as much as about 50 percent depending upon the amount of tensile force applied to the braid during the densification process. When maximum allowable tensile force is applied, a void fraction reduction of of about 50 percent is achieved; the void fractions of braids subjected to this maximum tensile force will ordinarily have a void fraction of from about 13 percent to about 23 percent, corresponding to a densified braid apparent density of from about 1.1 to about 1.25 grams per cubic centimeter.

The void fraction of densified braid may be computed directly by subtracting the volume of solid in the braid from the total braid volume, total braid volume being the volume of a cylinder having a diameter equal to the measured diameter of the braid in the case of circular cross sectioned braids, or other appropriately computed volumes in cases where the braid does not have a circular cross section. The volume of solids in densified braid is readily computed from the density of the solid and the measured denier of the densified braid, or by other suitable means.

Densified braid is conveniently prepared by stretching nondensified braid at temperatures ranging from about 20° C. to about 170° C. with a temperature range of about 130° C. to about 150° C. preferred. It is important, at least in the case of polyglycolic acid, that the braid be stretched in a dry atmosphere, especially when the stretching is carried out at higher temperatures, in order to prevent degradation of the polymer.

Figure 1:
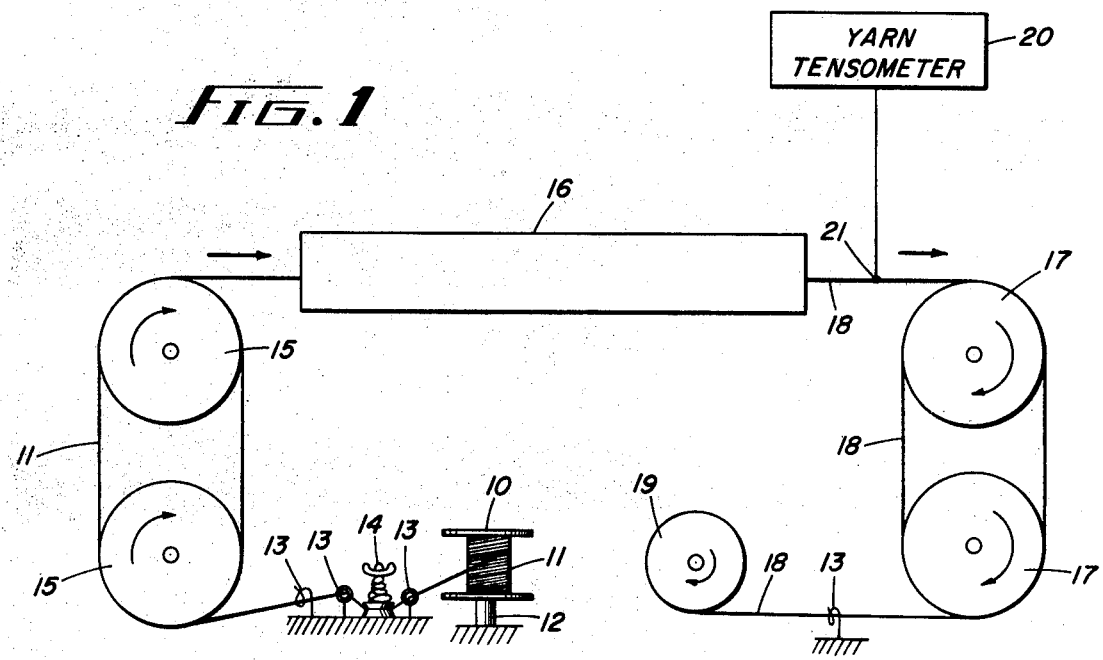
FIG. 1 is a schematic drawing of apparatus which is particularly suitable for preparing the densified suture braid of this invention.

FIG. 1 is a schematic diagram of apparatus particularly suitable for preparing the densified braid of this invention. Referring to FIG. 1, a spool 10 containing nondensified braid 11 is mounted on spindle 12. Braid 11 is fed through guides 13 and tension disc 14 to feed Godet rolls 15, which direct the braid through optionally heated tunnel 16 and on to takeup Godet rolls 17 from which densified braid 18 is fed to windup bobbin 19. Rolls 15 and 17 are operated at different speeds to insure application of a tensile force to the braid as it passes through tunnel 16. The tensile force so applied is conveniently measured by yarn tensimeter 20 which measures the tensile force at a point 21 immediately following emergence of the braid from tunnel 16. The rate of speed at which braid travels through tunnel 16 is not critical. However, particularly suitable results are achieved using a braid speed of about 3 feet to about 125 feet per minute, with a speed of about 100 feet per minute preferred.

Figure 3:
Figure 4:

FIGS. 2 to 4 show enlarged side elevational views of three polyglycolic acid suture braids, and are intended to visually indicate the compaction and densification of the braid structure which occur when nondensified braid is subjected to a tensile force as described hereinabove. Referring to FIGS. 2 to 4, braid 22 represents a nondensified braid having a diameter of 18.8 mils, said braid being prepared in accordance with the data shown in Table II for a size 1 braid. It will be noted that braid 22 is characterized by a very loose braid configuration. Braid 23 is a picture of braid 22 after it has been subjected to a tensile force of 8 pounds in accordance with a process described hereinabove. Braid 23 has a diameter of 17.5 mils, indicating a reduction of about 7 percent in the original diameter of braid 22. The braid structure in braid 23 is more densified than that in braid 22. Braid 24 is a picture of braid 22 after it has been subjected to a tensile force of 13.5 pounds, this tensile force representing about three-fourths the straight pull of nondensified braid 22. Braid 24 has a diameter of 16.8 mils, indicating a reduction of about 11 percent in the original diameter of braid 22; braid 24 clearly has a highly compacted braided structure. The progressive densification of braid 22 which occurs as the tensile force during stretching is increased is readily seen in FIG. 2.

Figure 5:
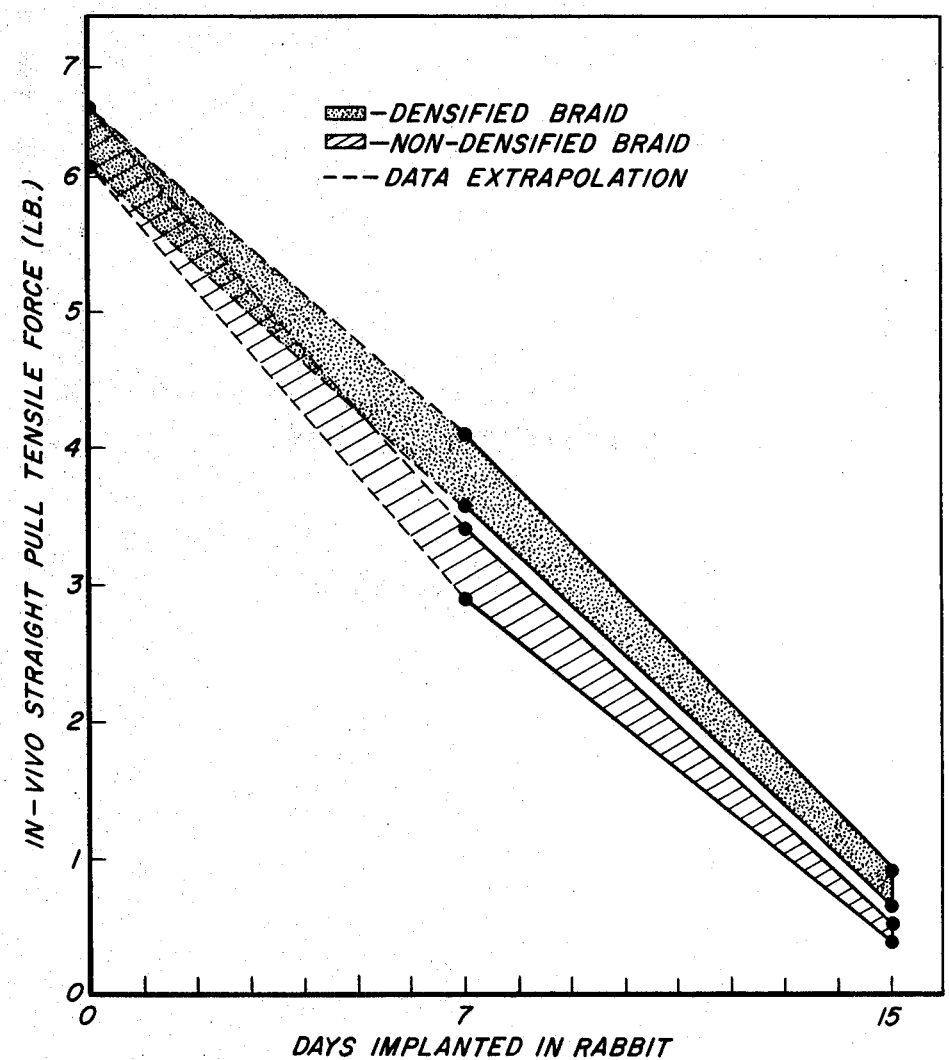
FIGS. 5 and 6 illustrate graphically the enhanced in vivo strength retention of the sutures of this invention by a comparison of in vivo tensile force values of densified and nondensified suture braids.

Table IV presents comparative data which demonstrate the enhanced in vivo tensile strength retention which is produced by the densified braids of this invention. The data of Table IV are shown graphically in FIG. 5. The in vivo data shown in Table IV and Table V hereinbelow were obtained by implanting densified and nondensified suture braids in rabbits for periods of 7 and 15 days, after which the rabbits were sacrificed and the braid removed for a tensile strength measurement, this measurement being made in the same manner as braid straight pull measurements discussed hereinabove.

TABLE IV.—IN-VIVO PROPERTIES OF DENSIFIED AND NON-DENSIFIED POLYGLYCOLIC ACID SUTURE BRAIDS

| | | Stretch conditions | | | In-vivo tensile strength at— | | | | | | | |
|---|---|---|---|---|---|---|---|---|---|---|---|---|
| | | | | | Day 7 | | | | Day 15 | | | |
| Diameter, mils | Rate, ft./min. | Tensile force, lb. | Temp., °C. | Lb. | P.s.i. | Percent lb. increase | Percent p.s.i. increase | Lb. | P.s.i. | Percent lb. increase | Percent p.s.i. increase |
| a | 10.7 | (No Stretch) | | 3.1 | 34,480 | | | .35 | 3,890 | | |
| | 9.8 | 3  1.25 | 150 | 3.6 | 47,726 | 16 | 38 | .87 | 11,500 | 149 | 196 |
| b | 10.6 | (No Stretch) | | 3.3 | 37,410 | | | .47 | 5,320 | | |
| | 10.1 | 3  1.25 | 150 | 3.5 | 43,685 | 6 | 17 | .77 | 9,610 | 64 | 81 |
| c | 10.8 | (No Stretch) | | 3.4 | 37,110 | | | .38 | 4,150 | | |
| | 10.2 | 3  1.25 | 150 | 3.6 | 44,056 | 6 | 19 | .76 | 9,280 | 100 | 124 |
| d | 10.8 | (No Stretch) | | 2.9 | 31,650 | | | .32 | 3,490 | | |
| | 10.2 | 3  1.25 | 150 | 4.1 | 50,000 | 41 | 58 | .64 | 7,800 | 100 | 124 |

TABLE V.—UPGRADING NON-DENSIFIED POLYGLYCOLIC ACID SUTURE BRAIDS

| | | Stretch conditions | | | Package properties | | In-vivo tensile strength at— | | | | | |
|---|---|---|---|---|---|---|---|---|---|---|---|---|
| | | | | | | | Day 7 | | | | Day 15 | |
| Diameter, mils | Rate ft./min. | Tensile force, lb. | Temp., °C. | | Straight pull, lb. | Knot pull, lb. | Lb. | P.s.i. | Percent lb. increase | Percent p.s.i. increase | Lb. | P.s.i. |
| a | 10.4 | (No Stretch) | | | 5.29 | | | | | | 0 | 0 |
| | 9.3 | 3  1.5 | 150 | | 5.29 | | | | | | .45 | 6,600 |
| b | 10.4 | (No Stretch) | | | 4.7 | 3.4 | 2.6 | 30,600 | | | 0 | 0 |
| | 9.6 | 3  1.25 | 150 | | 4.5 | 2.8 | 3.3 | 45,600 | 27 | 49 | 1.25 | 17,300 |
| c | 10.2 | (No Stretch) | | | 5.0 | 3.7 | 2.2 | 26,900 | | | 0 | 0 |
| | 9.4 | 3  1.25 | 150 | | 4.9 | 3.1 | 3.3 | 47,550 | 50 | 77 | .53 | 7,650 |

Referring to Table IV, it is observed that in all cases not only is there an enhancement of the p.s.i. values of the densified braid, which would be expected were one to merely reduce the diameter while not changing the amount of solid material in the braid, but also a substantial enhancement, particularly in the 15 day values, of the tensile strength, measured in pounds, of the braid. This latter increase clearly indicates that the densified braid structure substantially diminishes the rate of attack of tissue fluids upon the braid structure and, in so doing, produces a substantial increase in tensile force values. The data of Table IV show an increase in the 7 day values, measured as pounds, of from 6 to 41 percent, while the 15 day values show increases of from 64 to 149 percent. The magnitude of these increases indicates the substantial improvement in in vivo strength retention which is achievable with the densified suture braids of this invention as compared to their nondensified counterparts.

Figure 6:
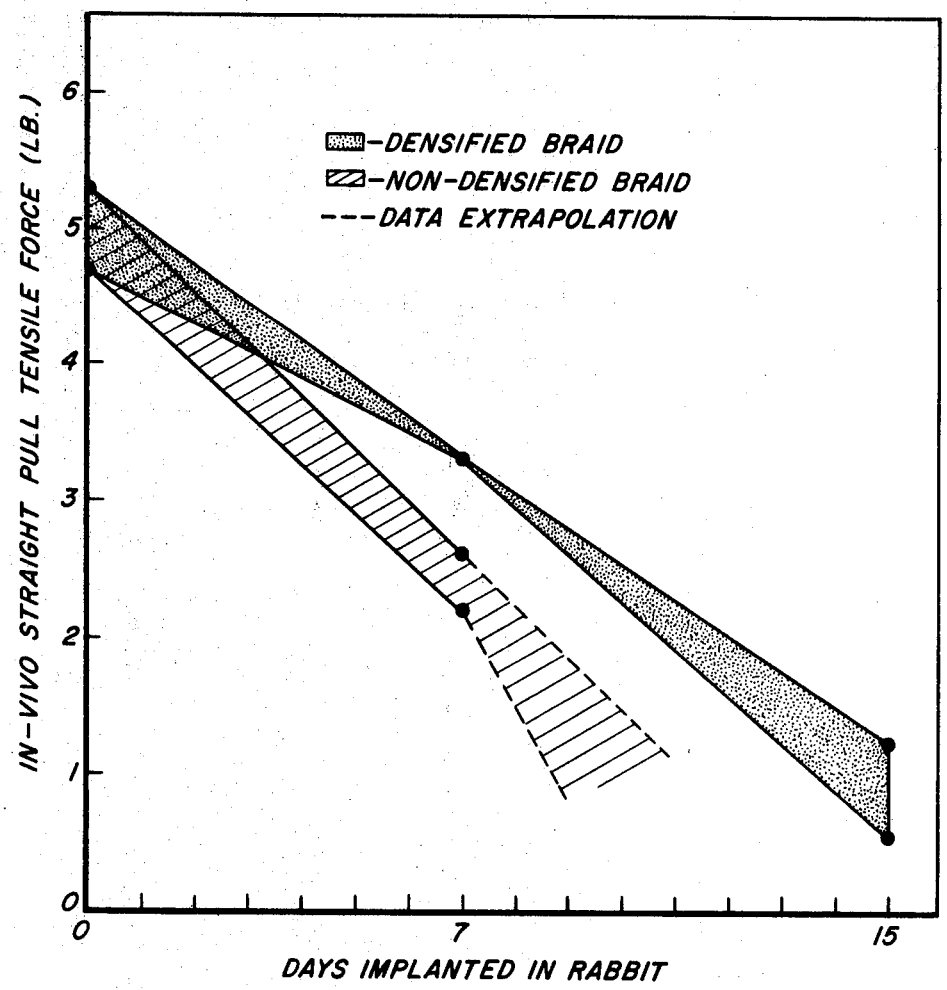

The technique of densifying an absorbable suture braid is particularly applicable as a method for increasing the strength of absorbable suture braids to previously unattainable levels. Table V presents data indicating how it is possible to convert a suture braid which ordinarily would retain only slight tensile strength after 15 days implantation in the body into a suture braid having a 15 day tensile strength of anywhere from 6600 p.s.i. to 17,300 p.s.i. There is also substantial improvement in the 7 day tensile strength. The data of Table V are shown graphically in FIG. 6.

It is desirable, within a given U.S.P. suture size, to prepare as densified a suture as practical. This is readily accomplished in accordance with this invention by deliberately preparing an oversized suture braid. By oversized braid is meant a braid having a diameter of up to about 10 to about 12 percent greater than the diameter of the desired U.S.P. size. The oversized braid is then subjected to a sufficiently high tensile force to reduce its diameter by up to about 10 to 12 percent so as to bring it within the required U.S.P. standard for that desired suture size, and thereby produce a highly densified suture braid of the desired U.S.P. size. When in vivo performance of densified braid is compared to that of nondensified braid of the same U.S.P. size, the in vivo strength of densified braid is substantially in excess of that of nondensified braid in accordance with the data shown in Table IV. Despite the greater in vivo strength observed with densified braid, both densified and nondensified braids are absorbed by the body within an acceptable 60 to 90 day period after implantation in the body.

The densified suture braids of this invention can be needled, sterilized, packaged, dyed, coated, used to close wounds, or otherwise treated and used, in a manner substantially as shown in U.S. Pat. No. 3,297,033 for polyglycolic acid sutures.

I claim:

1. An absorbable densified polyglycolic acid suture having improved 7 and 15 day absorption characteristics, and at least about 64 percent greater strength at 15 days for a standard size comprising:
   a plurality of individual polyglycolic acid filaments;
   at least the external filaments having a braided construction;
   the entire suture being tightly compacted by the external braid structure;
   having a void fraction of from about 13 percent to about 23 percent,
   and the apparent density being from about 1.1 to about 1.25 grams per cubic centimeter.

2. A method for preparing an absorbable densified polyglycolic acid suture braid which comprises:
   subjecting an absorbable nondensified polyglycolic acid suture braid to a tensile pull of up to about three-fourths of the force required to break said braid, in a dry atmosphere, at a temperature between about 20° C. and 170° C., thereby reducing the void fraction to about 13 percent to about 23 percent, and increasing the apparent density to about 1.1 to about 1.25 grams per cubic centimeter, and increasing the 7 and 15 day strength in normal muscular tissue.

3. The method of claim 2 wherein the temperature is from about 130° C. to about 150° C.

4. The method of claim 3 wherein the tensile pull is equal to the knot strength of the undensified suture.

UNITED STATES PATENT OFFICE
CERTIFICATE OF CORRECTION

Patent No. 3,565,077     Dated February 23, 1971

Inventor(s) ARTHUR GLICK

It is certified that error appears in the above-identified patent and that said Letters Patent are hereby corrected as shown below:

Column 4, lines 14 & 15 "$\left(\frac{D_m}{D_b}\right)^2$" should read

-- % Void Fraction Per Unit Length of Braid = $100 - 100 N_m \left(\frac{D_m}{D_b}\right)$ Column 4, line 17 after "wherein:" delete -- Table --.

Signed and sealed this 29th day of May 1973.

(SEAL)
Attest:

EDWARD M. FLETCHER, JR.      ROBERT GOTTSCHALK
Attesting Officer             Commissioner of Patents